(12) United States Patent
Boesen et al.

(10) Patent No.: US 10,104,464 B2
(45) Date of Patent: Oct. 16, 2018

(54) WIRELESS EARPIECE AND SMART GLASSES SYSTEM AND METHOD

(71) Applicant: BRAGI GmbH, München (DE)

(72) Inventors: Peter Vincent Boesen, München (DE); Jake Berry Turner, München (DE)

(*) Notice: Subject to any disclaimer, the term of this patent is extended or adjusted under 35 U.S.C. 154(b) by 0 days.

(21) Appl. No.: 15/682,986

(22) Filed: Aug. 22, 2017

(65) Prior Publication Data
US 2018/0063625 A1 Mar. 1, 2018

Related U.S. Application Data

(60) Provisional application No. 62/379,534, filed on Aug. 25, 2016.

(51) Int. Cl.
*H04R 1/10* (2006.01)
*G06F 3/16* (2006.01)
(Continued)

(52) U.S. Cl.
CPC ....... H04R 1/1041 (2013.01); G02B 27/0172 (2013.01); G06F 3/167 (2013.01);
(Continued)

(58) Field of Classification Search
CPC ............ H04R 1/1041; H04R 1/1016; H04R 2420/07; G02B 27/0172;
(Continued)

(56) References Cited

U.S. PATENT DOCUMENTS 2,325,590 A 7/1943 Carlisle et al.
2,430,229 A 11/1947 Kelsey
(Continued)

FOREIGN PATENT DOCUMENTS

CN 204244472 U 4/2015
CN 104683519 A 6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Vivian Chin
*Assistant Examiner* — Con P Tran
(74) *Attorney, Agent, or Firm* — Goodhue, Coleman & Owens, P.C.

(57) ABSTRACT

A method includes providing a set of earpieces comprising a left ear piece and a right ear piece, each of the earpieces comprising an ear piece housing, a wireless transceiver disposed within the ear piece housing, a processor disposed within the housing and operatively connected to the wireless transceiver. The method further includes providing a set of eyeglasses comprising an eyeglass frame, a wireless transceiver disposed within the eyeglass frame, a processor disposed within the eyeglass frame, and a first lens and a second lens operatively connected to the eyeglass frame. The method provides for communicating data between at least one of the set of earpieces and the set of eyeglasses.

20 Claims, 11 Drawing Sheets

(51) Int. Cl.
*G02B 27/01* (2006.01)
*G06F 3/01* (2006.01)

(52) U.S. Cl.
CPC ... *H04R 1/1016* (2013.01); *G02B 2027/0138* (2013.01); *G02B 2027/0178* (2013.01); *G06F 3/017* (2013.01); *H04R 2420/07* (2013.01)

(58) Field of Classification Search
CPC .... G02B 2027/0138; G02B 2027/0178; G06F 3/167; G06F 3/017
USPC .......... 381/74, 381, 374, 327, 311, 315; 351/158, 41, 159.01; 455/90.3, 344; 348/47, 159
See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Pickens et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,112,066 B2 | 2/2012 | Ayed |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| 8,467,770 B1 | 6/2013 | Ayed |
| D687,021 S | 7/2013 | Yuen |
| 8,548,532 B1 | 10/2013 | Ng |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,480,096 B1 * | 10/2016 | Lee .............. H04W 8/005 |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |

(56) References Cited

U.S. PATENT DOCUMENTS

| | | |
|---|---|---|
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1* | 6/2008 | LeBoeuf ............... A61B 5/0059 600/300 |
| 2008/0201137 A1 | 8/2008 | Vos et al. |
| 2008/0254780 A1 | 10/2008 | Kuhl et al. |
| 2008/0255430 A1 | 10/2008 | Alexandersson et al. |
| 2008/0298606 A1* | 12/2008 | Johnson ............... H04R 1/1091 381/74 |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0215921 A1 | 9/2011 | Ayed et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0065617 A1 | 3/2013 | Peled |
| 2013/0137491 A1 | 5/2013 | Tanaka et al. |
| 2013/0316642 A1 | 11/2013 | Newham |
| 2013/0316679 A1 | 11/2013 | Miller et al. |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0200883 A1 | 7/2014 | Usher et al. |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0266988 A1* | 9/2014 | Fisher ............... G02B 27/017 345/8 |
| 2014/0270191 A1 | 9/2014 | Nikles |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0226621 A1 | 8/2015 | Zhu et al. |
| 2015/0245127 A1 | 8/2015 | Shaffer |
| 2016/0021229 A1 | 1/2016 | Lewis et al. |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0204839 A1* | 7/2016 | Liu ............... H04B 1/385 345/8 |
| 2016/0360350 A1 | 12/2016 | Watson et al. |
| 2017/0013360 A1 | 1/2017 | Hviid |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0105622 A1 | 4/2017 | Boesen et al. |
| 2017/0108697 A1* | 4/2017 | El-Ghoroury ............ G09G 5/10 |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0111834 A1 | 4/2017 | Belverato |
| 2017/0115742 A1* | 4/2017 | Xing ............... G06F 3/012 |
| 2017/0139668 A1 | 5/2017 | Steiner |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151956 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0257694 A1 | 9/2017 | Boesen |
| 2017/0257698 A1 | 9/2017 | Boesen et al. |

(56) References Cited

U.S. PATENT DOCUMENTS

2017/0257717 A1 9/2017 Milevski et al.
2017/0347248 A1* 11/2017 Miller .................. H04R 1/1041

FOREIGN PATENT DOCUMENTS

| | | |
|---|---|---|
| CN | 104837094 A | 8/2015 |
| EP | 1469659 A1 | 10/2004 |
| EP | 2903186 A1 | 8/2015 |
| GB | 2074817 | 4/1981 |
| GB | 2508226 A | 5/2014 |
| WO | 2008103925 A1 | 8/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2015).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview, (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
International Search Report & Written Opinion, PCT/EP2016/070231 (dated Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

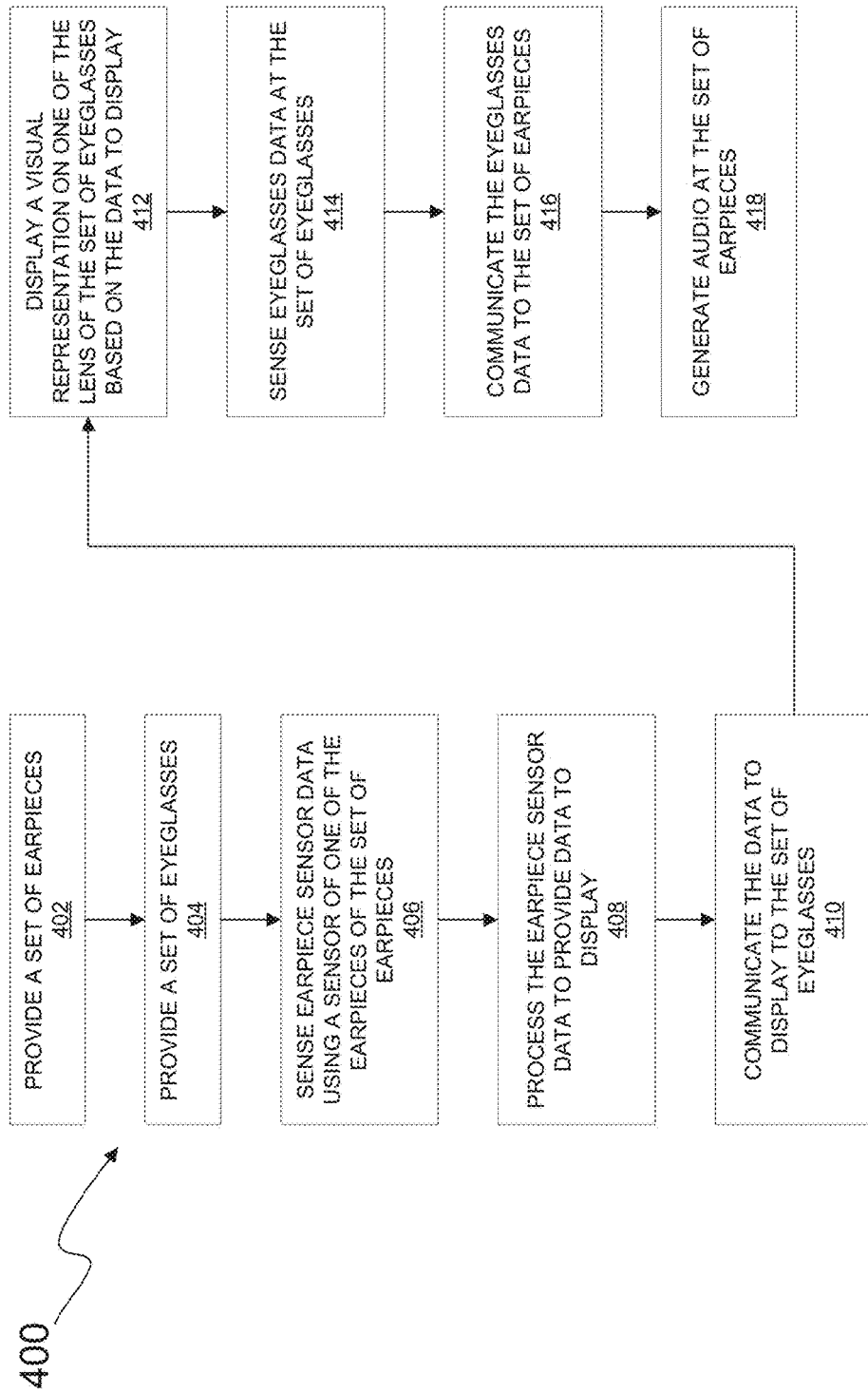

WIRELESS EARPIECE AND SMART GLASSES SYSTEM AND METHOD

PRIORITY STATEMENT

This application claims priority to U.S. Provisional Patent Application 62/379,534, filed on Aug. 25, 2016, and entitled Wireless Earpiece and Smart Glasses System and Method, hereby incorporated by reference in its entirety.

FIELD OF THE INVENTION

The present invention relates to wearable devices. More particularly, but not exclusively, the present invention relates to wireless ear pieces and smart glasses.

BACKGROUND

The possibilities of virtual reality and augmented reality present new and impressive use cases, as well as potential that far exceeds those that are currently predicted. This new technology offers an unparalleled potential for enhancements to our sensory input methods, as well as providing for the possibility of the extension of such enhancements in order to assist those who have ongoing and persistent sensory deficits. Current technology is however, somewhat limited. What is needed is a new and integrated method for sharing data between smart glasses as well as smart earpieces.

SUMMARY

Therefore, it is a primary object, feature, or advantage of the present invention to improve over the state of the art.

It is a further object, feature, or advantage of the present invention to provide enhanced controls based upon thin film polymer technology.

It is a still further object, feature, or advantage of the present invention to provide enhanced imaging based upon thin film polymer technology.

Another object, feature, or advantage is to provide enhanced visual fields based upon thin film polymer technology.

Another object, feature, or advantage is to provide the ability to place thin film polymer technology onto both side of the lens.

Yet another object, feature, or advantage is to provide the ability of the smart glasses to interact with the smart earpieces of the user.

A further object, feature, or advantage is to provide an enhanced ability to measure biometrics and display the biometrics to the user.

A still further object, feature, or advantage is to provide enhanced feedback controls for visual based interfaces using the audio engine, as well as from the audio engine to display data on the visual based interfaces.

Another object, feature, or advantage is to provide enhanced localization, quantitative and qualitative analysis of acoustic sources from earpiece. Data from which can be fed to the glasses to provide visual cues with information on the acoustic source.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, the present invention provides a smart linkage of completely wireless earpieces to smart glasses. Such linkages will highlight the strength of each platform. Data aggregated at the earpiece may be wirelessly transmitted to the screen(s) of the smart glasses for viewing by the user. Further, data aggregated by the smart glasses or auditory inputs from the smart glasses may be wirelessly transmitted to the smart earpieces for input via the auditory pathway. This has multiple advantages over any previously considered systems. The system may be streamlined so that sensor arrays need not be duplicated. Power management may be enhanced due to the removal of the need for each device to have similar sensor arrays, e.g. accelerometers. Alternately, both devices may have duplicate sensors so that compiled data could be processed for greater precision.

Thin film polymer may be used on the smart glasses as a part of a display system. The thin film polymer may be positioned on the internal or external side of the lens(es) or the thin film polymer may be placed on both sides of the lens of the glasses to create a natural scenario where depth of image may be provided. This allows for filtering the image presented to the retina in another way. Alternately, the effect which would be detected by the user may be adjusted. Either alternately or in conjunction, images may be projected directly onto the retina. This would allow the user an unparalleled advantage in the augmented or assisted visual world. Certainly, recording or image capture would be able to be facilitated from the forward facing, or case dependently rear facing cameras. The cameras of the smart glasses may interact with the world and provide visual based analysis of the user's environment. The glasses may then supply information to the smart earpieces to coordinate, highlight, augment or otherwise alert the user to the information in a timely and responsive measure. One example may be explained as such: a forward facing camera detects the presence of an ambulance moving into the central field of vision from the peripheral field of vision of the user. The sensing mechanism may highlight the image of the emergency vehicle relative to the tracking position of the user. Auditory linkage to the smart earpiece may selectively highlight the position of the siren and modulate the environmental conditions to highlight the position acoustically for the user in three dimensional space. The complementary linking of the two principal technologies, may therefore that the siren could be localized when it is not-yet visible, and visual cues given as to its location.

Additionally, this system may give rise to camera systems that could monitor the "peripheral visual field" of the user as well as the lateral and posterior fields. This would allow theoretical access to 360 degree visual fields. Such fields could be tied into the camera systems available to them from smart earpieces or other connected body worn devices.

Thus, according to one aspect we may construct the "assistive vision" capabilities as well as "augmented vision" into the visual field of the user. This parallels with the smart ear based system that would allow a wide suite of biometric measurements as well as detailed position sensors. Control systems may be enhanced both from the visual as well as the audio worlds. For example, one could track the pupils, the smart glasses would be able to detect from the front facing cameras what the person was looking at with reasonable certainty. This information may be transmitted to the smart earpieces which may then process the request and do a search, as but one example. Feedback to the user may be given acoustically, as well as visually. The choice may be made by the user as to which approach the user would prefer. Additionally, visually instituted actions may be able to coordinate with an audio mechanism for enhanced feedback. Such feedback may be optimized to provide for feedback from the audio system to the visual system or from the visual system to the audio system.

According to one aspect, a method includes providing a set of earpieces comprising a left ear piece and a right ear piece, each of the earpieces comprising an ear piece housing, a wireless transceiver disposed within the ear piece housing, a processor disposed within the housing and operatively connected to the wireless transceiver. The method further includes providing a set of eyeglasses comprising an eyeglass frame, a wireless transceiver disposed within the eyeglass frame, a processor disposed within the eyeglass frame, and a first lens and a second lens operatively connected to the eyeglass frame. The method provides for communicating data between at least one of the set of earpieces and the set of eyeglasses. The communicating is wirelessly communicating. The method may further provide for displaying on the first lens or the second lens data from the one of the set of earpieces. The method may further include at least one sensor on the set of eye glasses and wherein the data is data from the set of eye glasses. The method may further include at least one sensor disposed within the left earpiece or the right earpiece and wherein the data is data from the at least one sensor. There may be a film on an external face of at least one of the first lens and the second lens configured to display imagery. There may be a film on an internal face of at least one of the first lens and the second lens configured to display imagery. The imagery may provide for augmented vision or assisted vision. There may be a first film on an external face of at least one of the first lens and the second lens configured to display a first set of imagery and a second film on an internal face of at least one of the first lens and the second lens configured to display a second set of imagery and wherein the first set of imagery and the second set of imagery combined to provide imagery having three-dimensional depth.

According to another aspect, a system includes a set of earpieces including a left ear piece and a right ear piece, each of the earpieces comprising an ear piece housing, a wireless transceiver disposed within the ear piece housing, a processor disposed within the housing and operatively connected to the wireless transceiver. The system further includes a set of eyeglasses comprising an eyeglass frame, a wireless transceiver disposed within the eyeglass frame, a processor disposed within the eyeglass frame, and a first lens and a second lens operatively connected to the eyeglass frame and a thin film polymer layer placed on at least one of the first lens or the second lens. At least one of the first lens and the second lens may be a corrective lens. The thin film polymer layer may be positioned on an inside of at least one of the first lens and the second lens or may be positioned on an outside of at least one of the first lens and the second lens, or there may be thin film polymer on both the inside and the outside of one or both of the lenses. The first lens and the second lens may be integral with one another. The thin film polymer may form a portion of a display. At least one of the earpieces may include at least one sensor operatively connected to the processor and the at least one of the earpieces is configured to communicate data from the at least one sensor to the set of eyeglasses, the set of eyeglasses configured to display the data collected from the at least one sensor on the display. The set of earpieces may be configured to provide feedback to the set of eyeglasses and/or the set of eyeglasses is configured to provide feedback to the set of earpieces.

According to another aspect, a method for interacting with a user is provided. The method includes providing a set of earpieces comprising a left ear piece and a right ear piece, each of the earpieces comprising an ear piece housing, a wireless transceiver disposed within the ear piece housing, a processor disposed within the housing and operatively connected to the wireless transceiver, at least one sensor operatively connected to the processor. The method further includes providing a set of eyeglasses comprising an eyeglass frame, a wireless transceiver disposed within the eyeglass frame, a processor disposed within the eyeglass frame, and a first lens and a second lens operatively connected to the eyeglass frame. The method further includes sensing earpiece sensor data at the set of earpieces using the at least one sensor of at least one of the left earpiece and the right earpiece, processing the earpiece sensor data at the set of earpieces to provide data to display, communicating the data to display from the set of earpieces to the set of eyeglasses, displaying a visual representation based on the data to display on at least one of the first lens and the second lens, sensing eyeglasses data at the set of eyeglasses, communicating the eyeglasses data from the set of eyeglasses to the set of earpieces, generating audio at the set of earpieces based on the eyeglasses data.

BRIEF DESCRIPTION OF THE DRAWINGS

FIG. 11 illustrates a flowchart of a method of interacting with a user.

DETAILED DESCRIPTION

Figure 1:
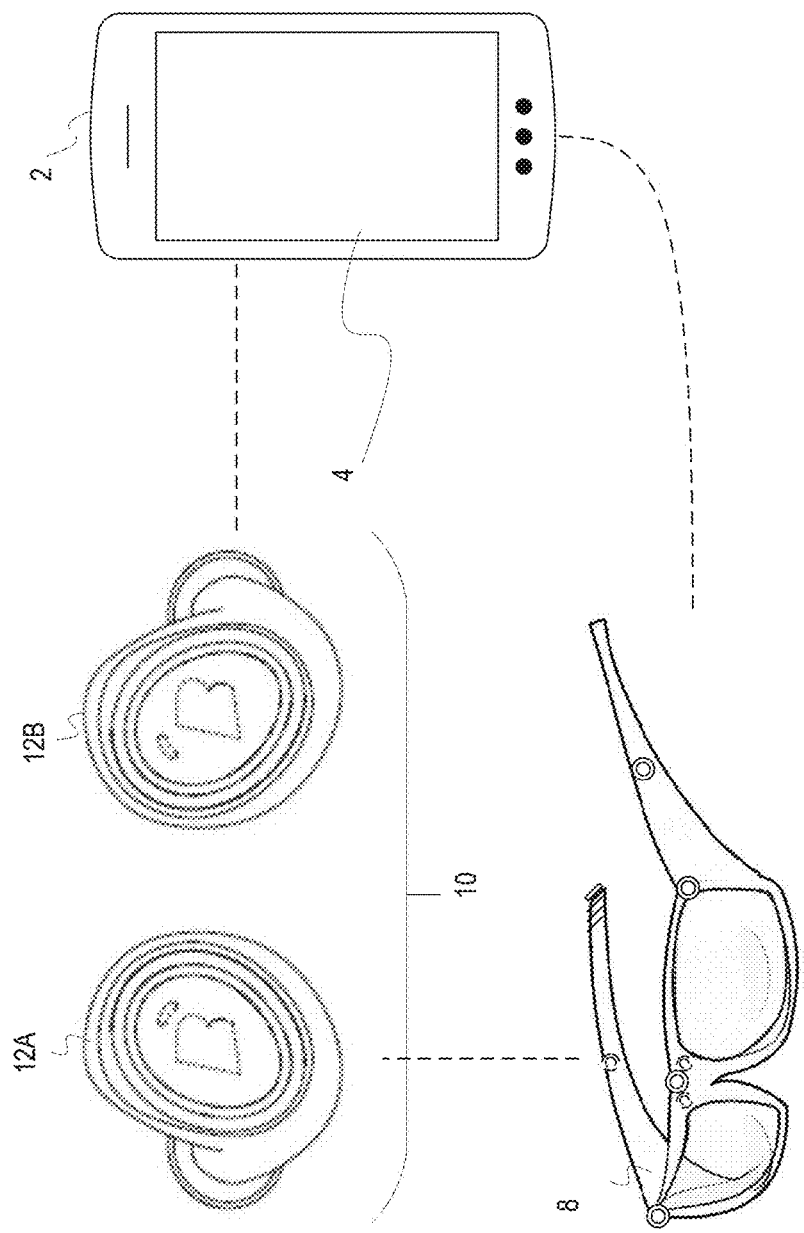
FIG. 1 illustrates a set of earpieces including a left earpiece and a right earpiece.

FIG. 1 illustrates a set of earpieces 10 including a left earpiece 12A and a right earpiece 12B. Also shown in FIG. 1 is a set of eyeglasses 8. The set of earpieces 10 and the set of eyeglasses together may form a system. The set of eyeglasses 8 may wirelessly communicate with one or both of the earpieces 12A, 12B. A computing device such as a mobile device such as a phone 2 with a display 4 may also be in wireless communication with one or more of the earpieces 12A as well as the set of glasses 8.

Figure 2:
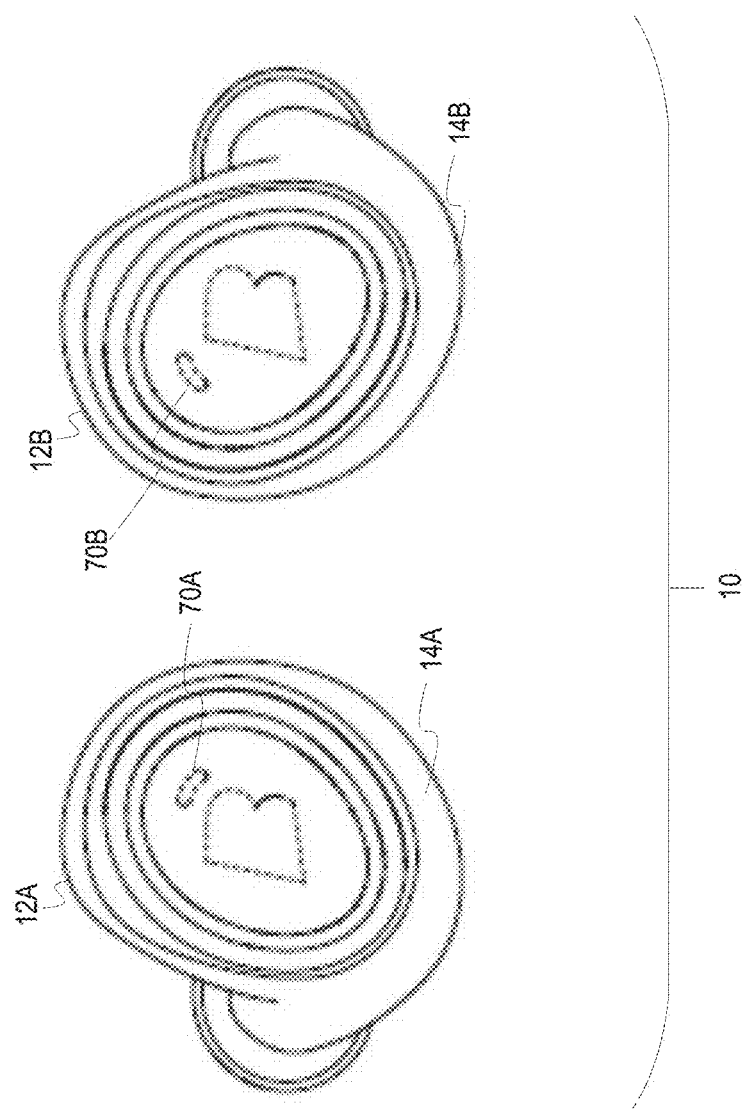
FIG. 2 illustrates one example of a set of earpieces in greater detail.

FIG. 2 illustrates one example of a set of earpieces in greater detail. The set of earpieces 10 includes a left earpiece 12A and a right earpiece 12B. Each of the earpieces 12A, 12B has an earpiece housing 14A, 14B. An external or outward facing microphone 70A in the left earpiece 12A and an outward facing microphone 70B in the right earpiece 12B are also shown. The external microphones may be used for sensing ambient or environmental sound.

Figure 3:
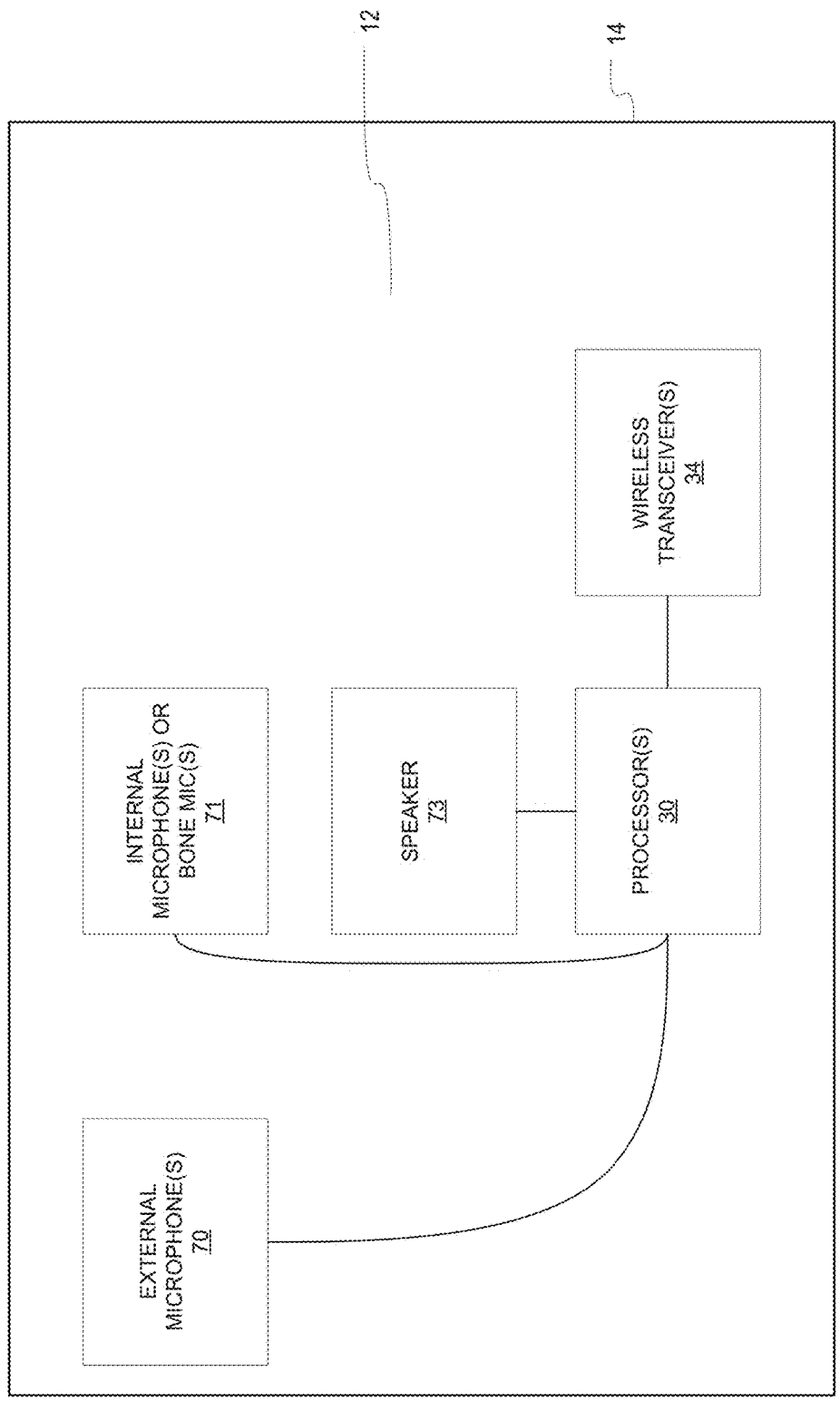
FIG. 3 is a block diagram illustrating one embodiment of an earpiece.

FIG. 3 is a block diagram illustrating one embodiment of an earpiece. The earpiece 12 has a housing 14. One or more processors 30 are disposed within the earpiece housing 14. One or more wireless transceivers 34 are operatively connected to the one or more processors 30. One or more external microphones 70 are operatively connected to the one or more processors 30. One or more internal microphones such as bone conduction microphones 71 are operatively connected to the processors 30. A speaker 73 is also shown which is operatively connected to one or more of the processors 30.

Figure 4:
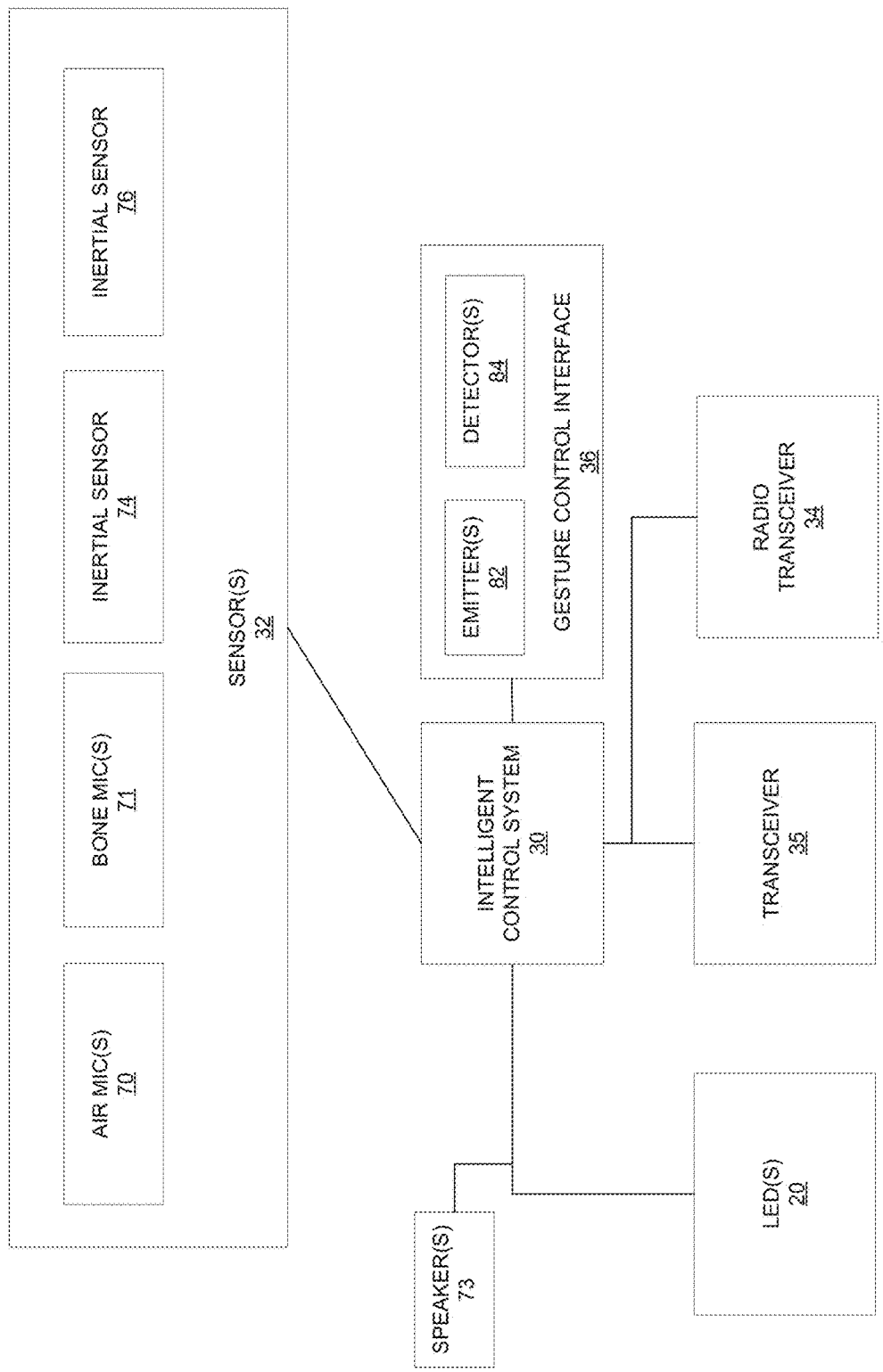
FIG. 4 is another block diagram illustrating another example of an earpiece.

FIG. 4 is another block diagram illustrating another example of an earpiece. The device may include one or more LEDs 20 electrically connected to an intelligent control system 30. The intelligent control system 30 may include one or more processors, microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more bone conduction microphones 71, one or more air conduction microphones 70 and/or other types of sensors. It is further contemplated that where multiple earpieces are used, a first or left earpiece may include a first subset of the sensors 32 and a second or right earpiece may include a second subset of the sensors 32.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range or radio transceiver 34 using Bluetooth, BLE, UWB, or other means of radio communication may also be present. In operation, the intelligent control system 30 may be configured to convey different information using one or more of the LED(s) 20 based on context or mode of operation of the device. The various sensors 32, the processor 30, and other electronic components may be located on the printed circuit board of the device. One or more speakers 73 may also be operatively connected to the intelligent control system 30.

Figure 5:
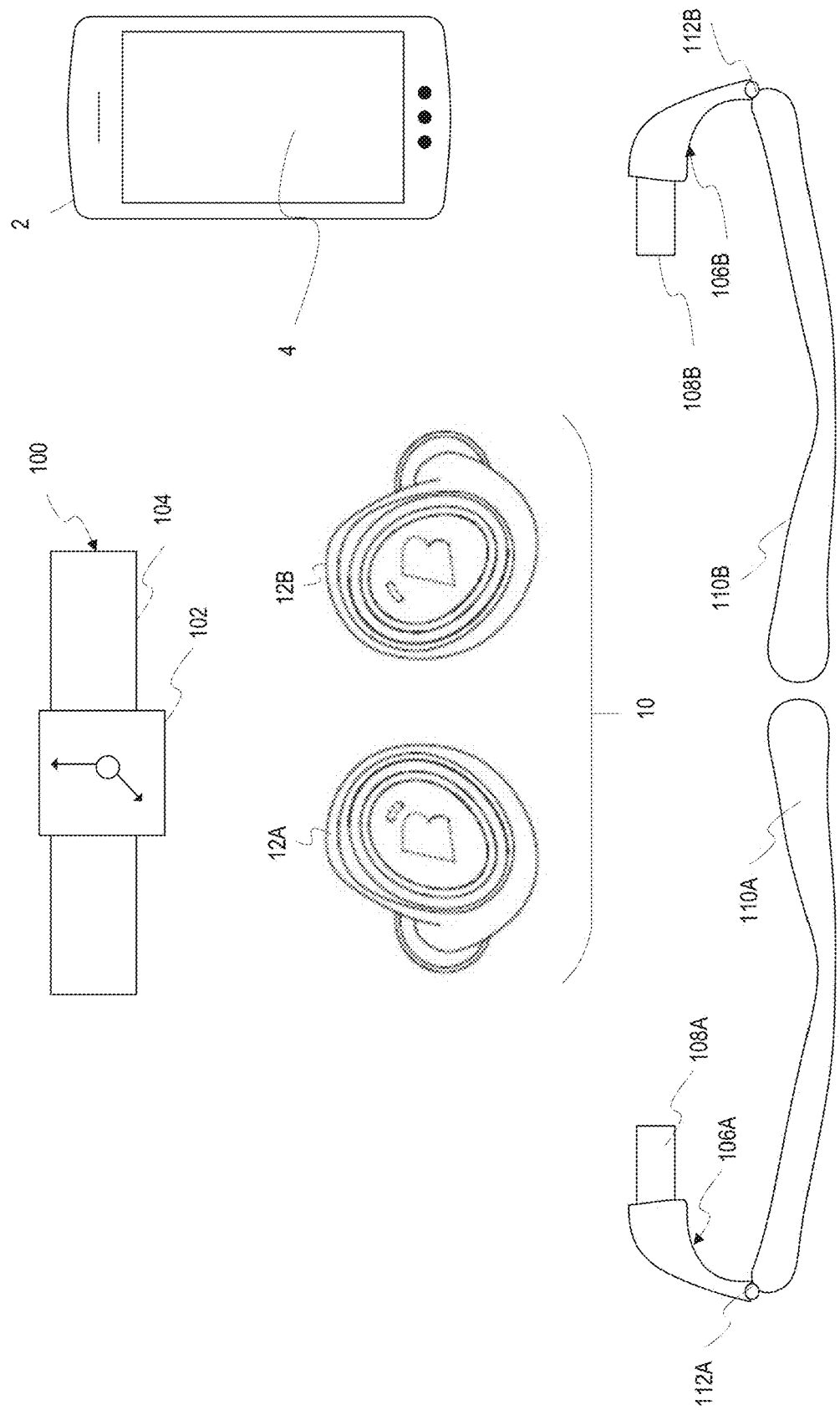
FIG. 5 illustrates examples of various devices.

FIG. 5 illustrates examples of various devices. A set of earpieces 10 includes a left earpiece 12A and a right earpiece 12B. Another example of a wearable device is a watch 100 which includes a display 102 and a watch band or strap 104. A set of glasses includes a first eye glass 106A and a second eye glass 106B. Each eye glass 106A, 106B has a display 108A, 108B, with a portion connected to the display connected with a hinge 112A, 112B to a side arm 110A, 110B. Also shown in FIG. 5 is a mobile device 2 which may be a smart phone or other mobile device having a display 4.

As shown there may be a wireless linkage between one or more wireless earpieces 10 and the smart glasses 106A, 106B. Such a linkage may serve to highlight the strength of each platform. Data aggregated at the earpiece 12A, 12B may be wirelessly transmitted to the screen(s) of the smart glasses 106A, 106B for viewing by the user. Further, data aggregated by the smart glasses 106A, 106B or auditory inputs from the smart glasses 106A, 106B may be wirelessly transmitted to the earpieces 12A, 12B for input via the auditory pathway. This has multiple advantages over any previously considered systems. The system may also be streamlined so that sensor arrays would not be duplicated been the glasses and the earpieces. Power management may be enhanced due to the removal of the need for each device to have similar sensor arrays, e.g. accelerometers. Alternately, both devices may have duplicate sensors so that compiled data could be processed for greater precision as may be appropriate for particular applications.

Figure 6:
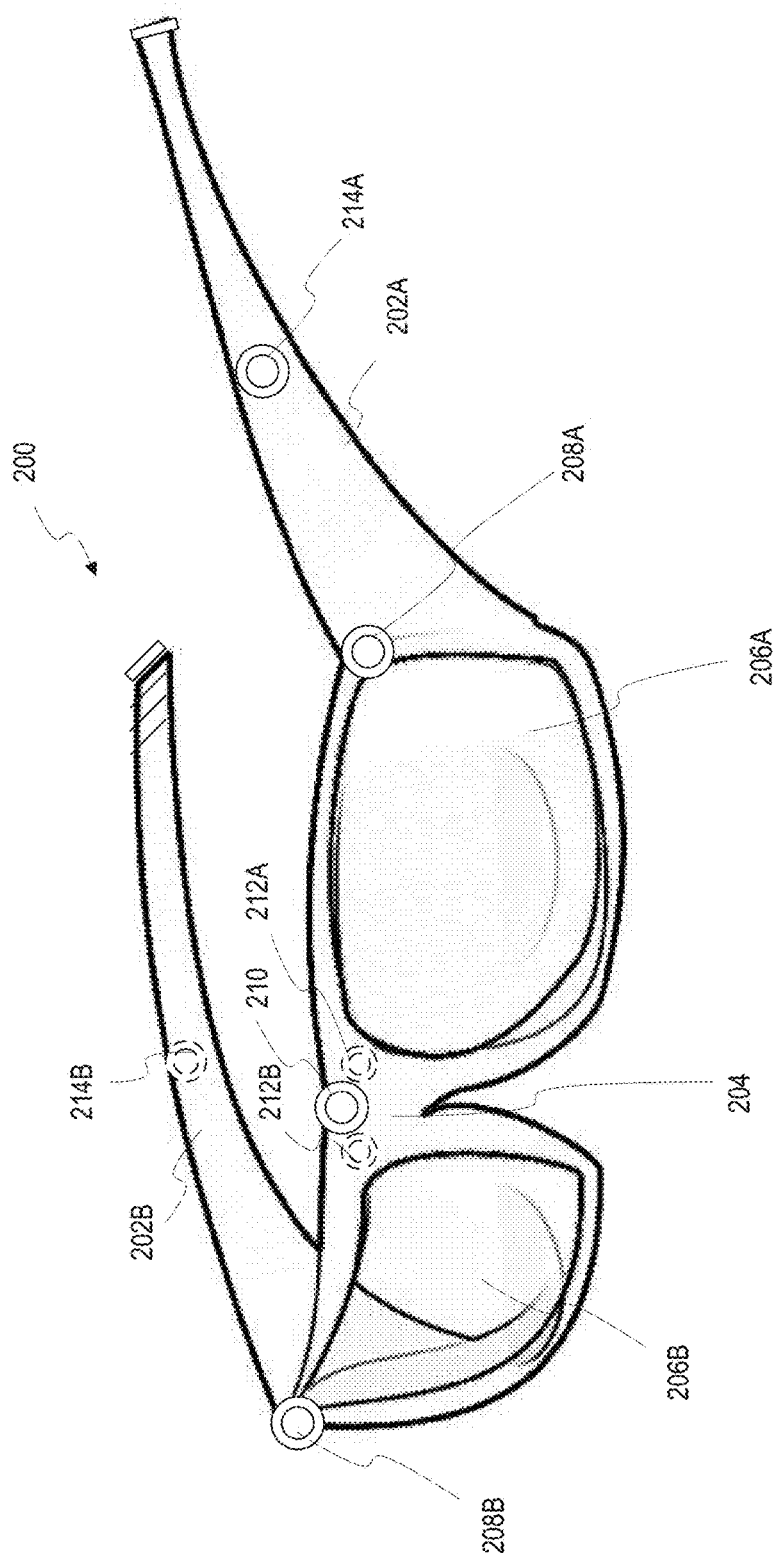
FIG. 6 illustrates another example of a set of glasses having a frame which includes side arms and a bridge area.

FIG. 6 illustrates another example of a set of glasses 200 having a frame which includes side arms 202A, 202B and a bridge area 204. Viewing areas 206A, 206B are mounted to the frame between the bridge area 204 and the side arms 202A, 202B. The viewing areas 206A, 206B may be traditional eyeglass lenses, corrective or non-corrective, formed from glass, plastic, polycarbonate, Trivex, or other materials. The lenses may be coated with a thin layer of film which allows for actively creating a display on the lenses. The thin layer of film may be positioned on an outer surface of the lenses, an inner surface of the lenses or both on an outer surface of the lenses and on an inner surface of the lenses. One or more cameras or other imaging sensors are positioned on the set of eyeglasses. This may include cameras on opposite sides of the glasses such as cameras 208A, 208B, a central camera 210 positioned at the bridge area 204, cameras 212A, 212B proximate the central camera 210 and positioned at the bridge area 204. Side facing cameras 214A, 214B may also be present.

Figure 7:
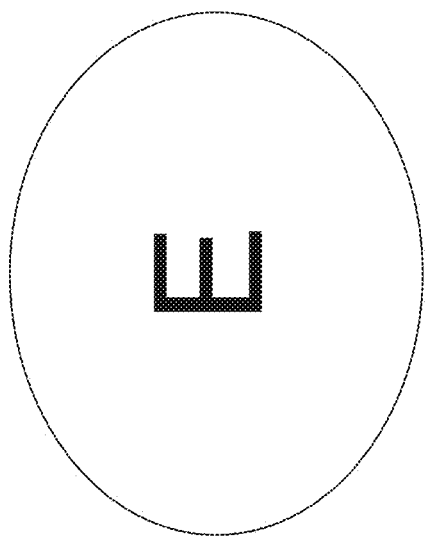
FIG. 7 illustrates one example of assisted vision through illustrating a view from a view area of an eyeglass on the left and an assisted view on the right.
Figure 7:
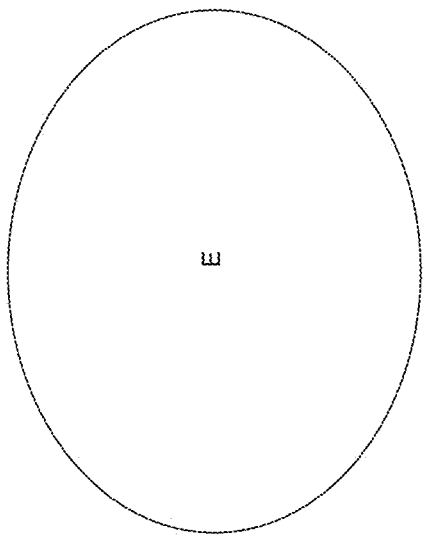

FIG. 7 illustrates one example of assisted vision through illustrating a view from a view area of an eyeglass on the left and an assisted view on the right. Note that on the right the displayed image is larger than on the left. In assisted vision, the displayed image is magnified relative to a representation that an individual sees or would see. Of course, other assisted vision features may be present which may include altering the size of images, altering colors of an image, or otherwise augmenting an image.

Figure 8:
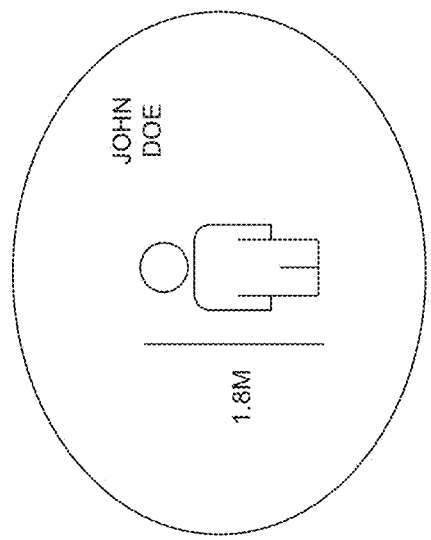
FIG. 8 illustrates an example of an augmented visual display.
Figure 8:
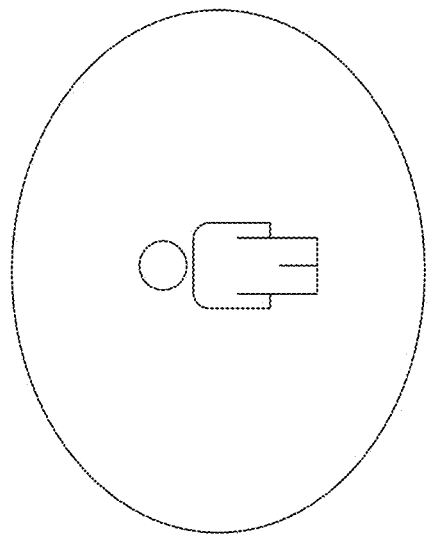

FIG. 8 illustrates an example of augmented vision. The augmented vision provides for contextual augmentation. Here, a scale has been applied to an image being viewed by an individual. Thus, in this instance a person wearing one or more eyeglasses is viewing another individual at left. At right, augmented vision is provided by overlaying a scale on the person, in this instance the person's height as measured along a vertical axis which is also shown. In addition, the name of the person, "John Doe", is also shown. Of course, other types of information may be presented.

According to one aspect, a person wearing one or more earpieces may also wear an eyeglass or a set of eyeglasses. The person may use the earpiece as a part of the user interface of the glasses. The earpiece may enhance the experience of using the eyeglass(es) in various ways. For example, the earpiece may provide for additional context than what is only available visually. This may include ambient noise, sensor data, or other data which is available using an earpiece which may be used to provide additional contextual clues to enhance an experience of a user.

Another way in which one or more earpieces may be used to enhance the experience of using the eyeglass(es) is to provide for voice prompts and voice commands. For example, the person may give a voice command to the earpiece to control operation of the eyeglass(es). For example, the person may say, "BRAGI, who is that?" to the earpiece. In response, a determination is made as to who the person is. This determination may be performed in various ways. According to one aspect, the determination is made by acquiring one or more images of the person and using the images to perform a search against a database. The database may be local or remote.

By way of another example, a physical item may have a bar code or three-dimensional bar code on it. The person may say, "BRAGI, what is that?" to the earpiece. In response a determination is made as to which article it is that the person wishes to identify. This determination may be made in any number of different ways. Including based on what object is in most central or direct view, based on what object is being held by or pointed to by a user or otherwise. In one embodiment, a bar code such a two-dimensional bar code may be identified and interpreted to provide additional information about an object.

Figure 9:
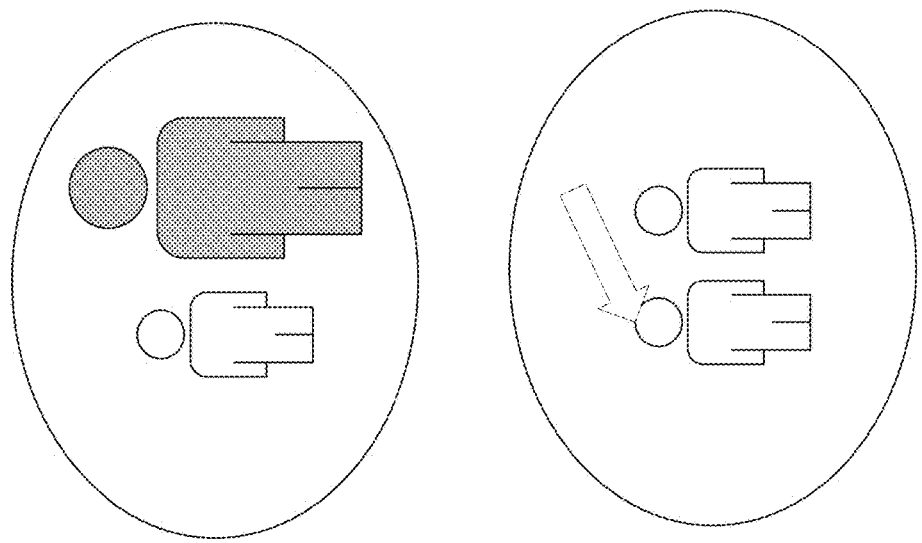
FIG. 9 illustrates examples of augmented visual displays.
Figure 9:
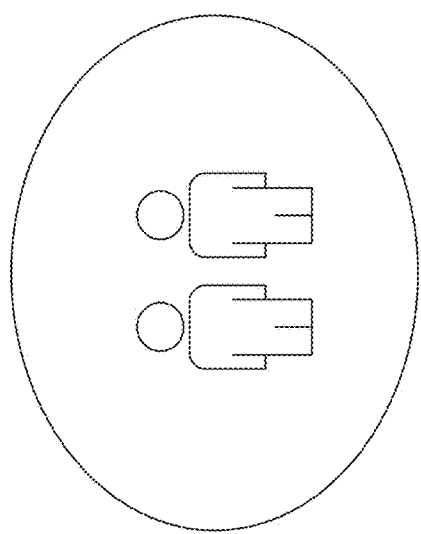

In both of the above examples, if it is unclear as to which person or object that the user wishes to identify, voice prompts may be used to assist in identifying them. For example, if two people are present and it is not clear which person the user wants to identify, then as shown in FIG. 9, an augmented visual display may be presented that emphasizes one of the individuals and a voice prompt may be provided to query, "Who is this?" The user may then respond such as by saying "Yes", "No", "No, to the left", or other response. Alternatively, the user may respond non-verbally by shaking their head yes or no where the earpiece includes an inertial sensor suitable for tracking head movement. To emphasize the person through augmentation, the size of the person may be enhanced, the color of the person may be altered, the image of the person may blink, or other type of emphasis may be placed. An alternative may be to add another shape such as an arrow to select a person or other object.

Thus, the earpiece may assist in operation of an eyeglass or eyeglasses by providing for voice commands, voice prompts, and additional sensor data to help establish context. In a system which includes one or more eyeglass and one or more earpieces various other advantages may be achieved where there is operative communication between the devices. For example, data aggregated at or associated with the earpiece may be wirelessly communicated to the eyeglass(s) to be displayed on the display of the smart glasses. In addition, where the eye glass or eye glasses are used in combination with one or more earpieces or other wearables, reduced functionality need be present in the eye glass or eye glasses which may be beneficial in reducing manufacturing cost of the device or allowing for extended battery life.

Thus, a smart linkage of completely wireless earpieces made be made with smart glasses. Such linkages allow for highlighting the strength of each platform. Data aggregated at the earpiece may be wirelessly transmitted to the screen(s) of the smart glasses for viewing by the user. Further, data aggregated by the smart glasses or auditory inputs from the smart glasses may be wirelessly transmitted to the smart earpieces for input via the auditory pathway. This has multiple advantages. The system may be streamlined so that sensor arrays need not be duplicated. Power management may be enhanced due to the removal of the need for each device to have similar sensor arrays, e.g. accelerometers. Alternately, both devices may have duplicate sensors so that compiled data could be processed for greater precision.

Certainly, recording or image capture may be facilitated from the forward facing, or case dependently rear facing cameras. The cameras of the smart glasses may interact with the world and provide visual based analysis of the user's environment. The glasses may then supply information to the smart earpieces that may coordinate, highlight, augment or otherwise alert the user to the information in a timely and responsive measure. One example would be explained as such: a forward facing camera detects the presence of an ambulance moving into the central field of vision from the peripheral field of vision of the user. The sensing mechanism may highlight the image of the emergency vehicle relative to the tracking position of the user. An auditory linkage to the smart earpiece may selectively highlight the position of the siren and modulate the environmental conditions to highlight the position acoustically for the user in three dimensional space. The complementary linking of the two principal technologies, would therefore logically be that the siren may be localized when it is not-yet visible, and visual cues given as to its location.

Additionally, this system allows for camera systems that may monitor the "peripheral visual field" of the user as well as the lateral and posterior fields. This allows theoretical access to 360 degree visual fields. Such fields may be tied into the camera systems available to them from smart earpieces or other connected body worn devices.

In addition, "assistive vision" capabilities as well as "augmented vision" may be placed into the visual field of the user. This may nicely parallel with the smart ear based system that allows a wide suite of biometric measurements as well as detailed position sensors. Control systems may be enhanced both from the visual as well as the audio worlds. For example, one may track the pupils using an inwardly facing camera such that the smart glasses may be able to detect from the front facing cameras what the person was looking at with reasonable certainty. This information may be transmitted to the smart earpieces which may process the request and do a search, as but one example. Feedback to the user may be given acoustically, as well as visually. The choice may be made by the user as to which approach the user would prefer. Additionally, visually instituted actions may be able to coordinate with an audio mechanism for enhanced feedback. Such feedback may be optimized to provide for feedback from the audio system to the visual system or from the visual system to the audio system.

Figure 10:
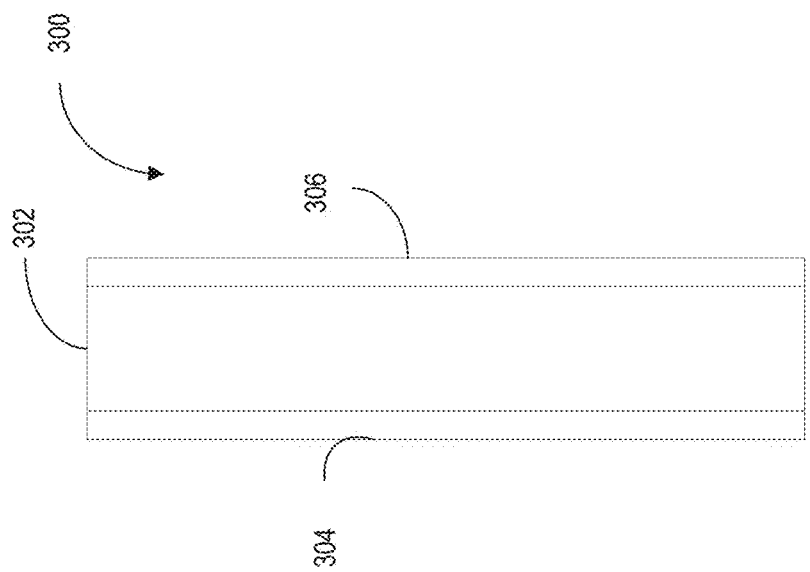
FIG. 10 illustrates a cross-section of a lens assembly having a thin polymer layer on both the inside and the outside.

According to another aspect, a thin film polymer may be placed on the lens to allow a screen to be created. As shown in FIG. 10, a lens assembly 300 may have a lens 302 with a thin film polymer 304, 306 on each side of the lens 302. Instead of placing the thin film polymer on both sides, the thin film polymer need only be present on one side. Where the thin film polymer is placed on both sides, a natural scenario may be created which allows for a depth of the image to be created. Thus, the effect detected by a user may be adjusted. Alternately or in conjunction with such effects, images may be projected directly onto the retina. This provides an unparalleled advantage in the augmented or assisted visual world.

According to another aspect, a method 400 for interacting with a user is provided in FIG. 11. The method includes providing 402 a set of earpieces comprising a left ear piece and a right ear piece, each of the earpieces comprising an ear piece housing, a wireless transceiver disposed within the ear piece housing, a processor disposed within the housing and operatively connected to the wireless transceiver, at least one sensor operatively connected to the processor. The method further includes providing 404 a set of eyeglasses comprising an eyeglass frame, a wireless transceiver disposed within the eyeglass frame, a processor disposed within the eyeglass frame, and a first lens and a second lens operatively connected to the eyeglass frame. The method further includes sensing 406 earpiece sensor data at the set of earpieces using the at least one sensor of at least one of the left earpiece and the right earpiece, processing 408 the earpiece sensor data at the set of earpieces to provide data to display, communicating 410 the data to display from the set of earpieces to the set of eyeglasses, displaying 412 a visual representation based on the data to display on at least one of the first lens and the second lens, sensing 414 eyeglasses data at the set of eyeglasses, communicating 416 the eyeglasses data from the set of eyeglasses to the set of earpieces, and generating audio 418 at the set of earpieces based on the eyeglasses data.

Therefore, various methods, systems and apparatus have been shown and described. Although specific embodiments are included, the present invention contemplates numerous additions, options, and alternations.

What is claimed is:

1. A method for interacting with a user, comprising:
providing a set of earpieces comprising a left ear piece and a right ear piece, each of the earpieces comprising an ear piece housing, a wireless transceiver disposed within the ear piece housing, a processor disposed within the housing and operatively connected to the wireless transceiver, and at least one sensor operatively connected to the processor;
providing a set of eyeglasses comprising an eyeglass frame, a wireless transceiver disposed within the eyeglass frame, a processor disposed within the eyeglass frame, and a first lens and a second lens operatively connected to the eyeglass frame;
sensing earpiece sensor data at the set of earpieces using at least one sensor of the set of earpieces;
processing the earpiece sensor data at the set of earpieces to provide data to display;
communicating the data to display from the set of earpieces to the set of eyeglasses;
displaying a visual representation based on the data to display on at least one of the first lens and the second lens;
sensing eyeglasses data at the set of eyeglasses;
communicating the eyeglasses data from the set of eyeglasses to the set of earpieces;
generating audio at the set of earpieces based on the eyeglasses data.

2. The method of claim 1 wherein the communicating the data to display from the set of earpieces to the set of eyeglasses comprises wirelessly communicating the data to display from the set of earpieces to the set of eyeglasses and wherein the communicating the eyeglasses data from the set of eyeglasses to the set of earpieces comprises wirelessly communicating the eyeglasses data from the set of eyeglasses to the set of earpieces.

3. The method of claim 2 wherein the set of eyeglasses further comprises a film on an external face of at least one of the first lens and the second lens configured to display imagery.

4. The method of claim 3 wherein the imagery is augmented vision imagery and wherein the data to display is augmented imagery data.

5. The method of claim 3 wherein the imagery is assisted vision imagery.

6. The method of claim 2 wherein the set of eyeglasses further comprises a film on an internal face of at least one of the first lens and the second lens configured to display imagery.

7. The method of claim 2 wherein the set of eyeglasses further comprises a first film on an external face of at least one of the first lens and the second lens configured to display a first set of imagery and a second film on an internal face of at least one of the first lens and the second lens configured to display a second set of imagery and wherein the first set of imagery and the second set of imagery combine to provide imagery perceived as having three-dimensional depth.

8. The method of claim 1 wherein the audio comprises an audio prompt requesting information from the user.

9. A system comprising:
a set of wireless earpieces comprising a left ear piece and a right ear piece, each of the wireless earpieces comprising an ear piece housing, a wireless transceiver disposed within the ear piece housing, a processor disposed within the housing and operatively connected to the wireless transceiver, and at least one sensor operatively connected to the processor;
a set of eyeglasses comprising an eyeglass frame, a wireless transceiver disposed within the eyeglass frame, a processor disposed within the eyeglass frame, and a first lens and a second lens operatively connected to the eyeglass frame; and
a thin film polymer layer placed on at least one of the first lens or the second lens;
wherein the set of wireless earpieces are wirelessly linked with the set of eyeglasses; and
wherein data aggregated by the set of wireless earpieces are wirelessly transmitted to the set of eyeglasses for providing context to an image viewed using the set of eyeglasses; wherein eyeglasses data sensed from the set of eyeglasses is wirelessly transmitted to the set of wireless earpieces and audio is generated at the set of wireless earpieces based on the eyeglasses data.

10. The system of claim 9 wherein at least one of the first lens and the second lens is a corrective lens.

11. The system of claim 9 wherein the thin film polymer layer is positioned on an inside of at least one of the first lens and the second lens.

12. The system of claim 9 wherein the thin film polymer layer is positioned on an outside of at least one of the first lens and the second lens.

13. The system of claim 9 wherein the thin film polymer layer is a first thin film polymer layer and the system further comprises a second thin film polymer layer wherein the first thin film polymer layer is on an inside of at least one of the first lens and the second lens and wherein the second thin film polymer layer on an outside of at least one of the first lens and the second lens.

14. The system of claim 9 wherein the first lens is integral with the second lens.

15. The system of claim 9 wherein the thin film polymer layer forms a portion of a display.

16. The system of claim 15 wherein the system is configured to display information from one or more of the wireless earpieces on the display.

17. The system of claim 9 wherein the set of eyeglasses further comprise at least one forward facing camera and at least one inward facing camera.

18. The system of claim 17 wherein the image is detected by the at least one forward facing camera in response to tracking a user's pupils by the at least one inward facing camera and transmitted to the set of wireless earpieces.

19. The system of claim 9 wherein a voice command is provided to the set of wireless earpieces to control an operation of the set of eyeglasses.

20. The system of claim 19 wherein the operation is related to identification.

* * * * *